Figure 1:
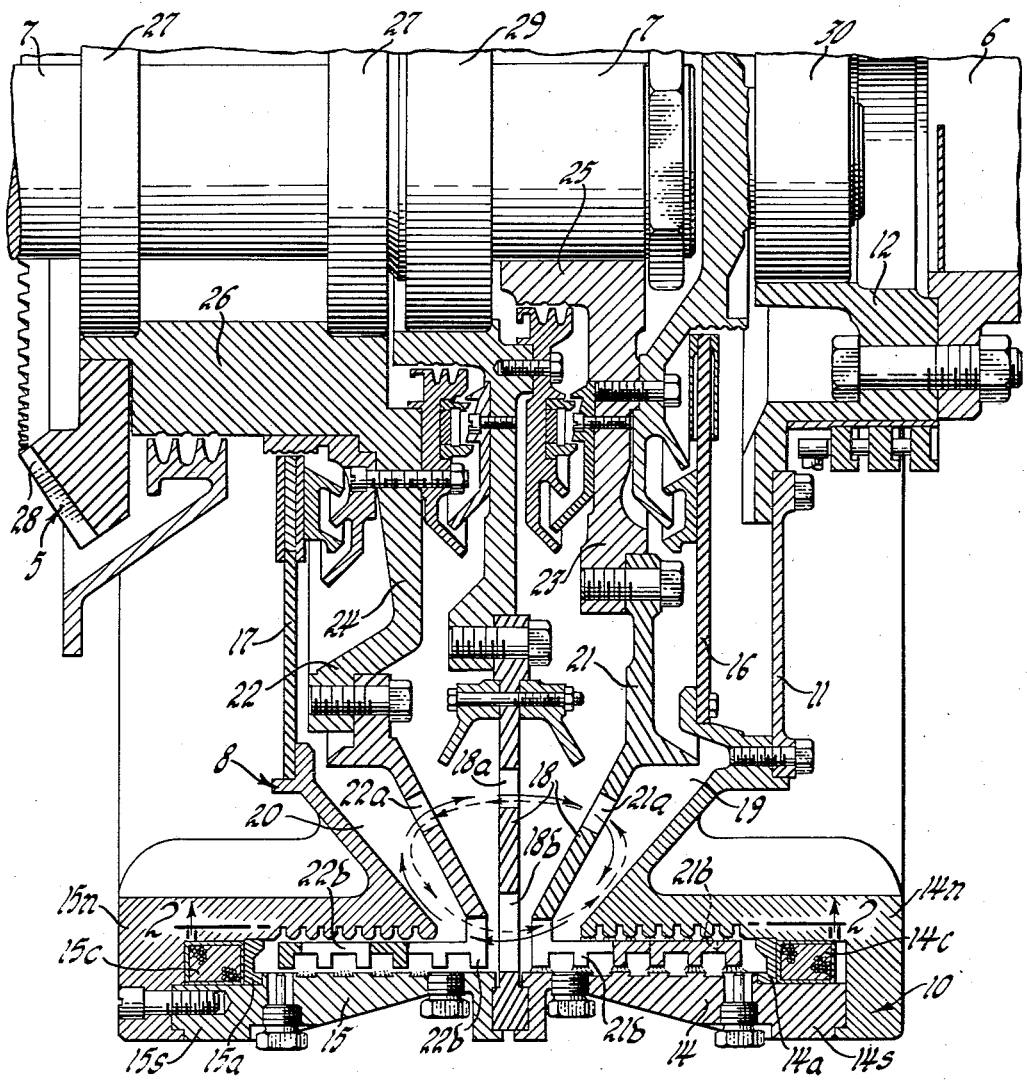

June 17, 1958   A. F. GRANT   2,839,170
REVERSING CLUTCH MECHANISM WITH MAGNETIC
PARTICLE CLUTCHING MEDIUM
Filed Nov. 30, 1956

INVENTOR.
Arthur F. Grant
BY
J. C. Thorpe
ATTORNEY

United States Patent Office 2,839,170
Patented June 17, 1958

2,839,170

REVERSING CLUTCH MECHANISM WITH MAGNETIC PARTICLE CLUTCHING MEDIUM

Arthur F. Grant, Cleveland, Ohio, assignor to General Motors Corporation, Detroit, Mich., a corporation of Delaware Application November 30, 1956, Serial No. 625,480

6 Claims. (Cl. 192—51)

This invention relates to a magnetic coupling device; more particularly, to a magnetic coupling or clutch of the type using a magnetic particle powder to establish a load transmitting bond between spaced face portions of two relatively rotatable clutch members under the influence of a magnetic field established therebetween; and, with regard to certain more specific aspects of the invention, to a multiple coupling unit of this type.

Magnetic particle clutches or couplings have a number of characteristics which make their use very attractive in a number of power transmitting applications. Among these are their inherent shock load limiting and vibration isolating characteristics, and their provision for controllable slip between an input and an output member up to a substantially locked-up load carrying condition. However, the use of magnetic particle powder in such couplings has presented a number of problems which have prevented widespread commercial usage of such couplings. Among these problems are the sealing of the magnetic particle powder within the coupling device and the destructive abrasion of the clutch members by the magnetic particle powder. In general, these problems stem from the abrasive nature of the magnetic particle powder and are aggravated in those applications where the coupling unit is de-energized for substantial periods of time. These problems are particularly pronounced in multiple coupling units wherein the relative rotation between the clutch elements of the de-energized coupling units results in substantial turbulence. Centrifugal packing of the magnetic particle powder between the coupling members has also represented a problem. In addition to reducing the engagement response and load carrying capacity of the coupling, such centrifugal packing has resulted in undesired engagements between the members and in preventing their disengagement when desired.

To alleviate the foregoing problems a number of different approaches have been made. A number of rather complicated labyrinth and magnetic type seals have been devised and various means have been provided for transferring the magnetic particle mixture from the magnetic gaps and for storing the mixture in suitable reservoirs upon clutch de-energization. It has also been found desirable to limit the particle fill to that quantity or volume of particles required to substantially bridge magnetic gaps between the input and output members of the coupling when the magnetic field is energized. By so limiting the particle fill, abrasive frictional drag between the clutch members and the particles is reduced and undesired engagement is prevented. However, as the particles are "run in" or "worked" they become smaller occupying less volume. This reduces the load carrying capacity of the coupling. It will thus be seen that the quantity or volume of particle fill has been a critical factor in the operation of such couplings and has been a factor difficult to control.

This invention contemplates an improved means for transferring magnetic particle powder from a de-energized coupling unit and has particular application to a multiple clutch unit wherein the magnetic particle powder is transferred from the de-energized coupling unit to an energized unit thus eliminating all particle turbulence in the de-energized unit and thereby the destructive abrasion of the clutch members and seals. The invention also alleviates the critical problem of particle fill.

Figure 2:
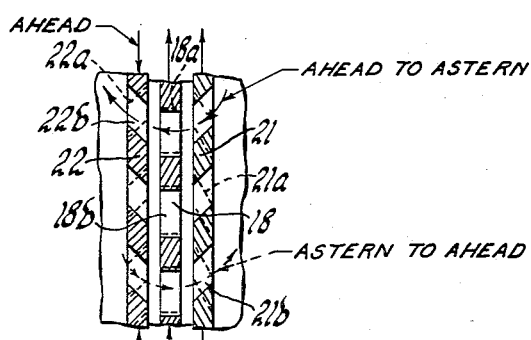

The foregoing and other objects, features and advantages of the invention will be more thoroughly understood from the following description of a two-way magnetic particle clutch mechanism embodying the invention with reference to the accompanying drawing, in which:

Figure 1 is a sectional view of the illustrative two-way clutch mechanism embodying the invention; and Figure 2 is a sectional development of the cylindrical plane represented by the line 2—2 of Figure 1.

Referring more particularly to the drawing, the two-way magnetic particle coupling or clutch shown in Figure 1 is cooperatively associated with a reversing transmission mechanism, partially shown at 5, to effect reversals in the driving relation between a power input shaft 6 and a power output shaft 7; the power input shaft 6 being part of and adapted to be rotatably driven by an engine or other suitable prime mover, and the power output shaft 7 being adapted to drive a suitable load mechanism such as a marine propeller. This transmission mechanism may be of any conventional type, but in the instant embodiment is of the differential type shown and described in United States patent application Ser. No. 443,775, filed July 16, 1954, in the name of Arthur F. Grant and entitled Magnetic Particle Coupling.

The two-way magnetic particle coupling includes an outer rotor 8 serving as the power input or driving clutch member. This rotor comprises an outer electromagnetic field pole assembly 10 which is drivingly connected by a radially inwardly extending web or spider 11 and a hub 12 to one end of the power input shaft 6. The outer field pole assembly of the rotor 8 comprises two axially opposed annular electromagnets 14 and 15 of horseshoe cross section which are selectively energizable by suitable control means, not shown, to provide either "ahead" or "astern" drive, respectively, through the coupling. The ahead driving electromagnet 14 comprises an inner pole member $14_n$, an outer pole member $14_s$, an annular field coil winding $14_c$ and a nonmagnetic coil cover or spacer $14_a$. Similarly, the astern driving electromagnet 15 comprises an inner pole member $15_n$, an outer pole member $15_s$, an annular field coil winding $15_c$ and a nonmagnetic coil cover or spacer $15_a$. Two web members 16 and 17 extend radially inwardly from the inner pole members $14_n$ and $15_n$, respectively, to form a chamber adapted to retain a quantity of magnetic particle powder. The adjacent end portions of the outer pole members $14_s$ and $15_s$ are separated by a nonmagnetic partition web assembly 18 which extends radially inwardly therefrom and separates the particle retaining chamber into an ahead compartment 19 and an astern compartment 20.

The opposing face portions of the field pole members $14_n$, $14_s$ and $15_n$, $15_s$ spacedly embrace axially extending cylindrical portions of an ahead inductor member 21 and an astern inductor member 22, respectively. The opposing face portions of the field pole members $14_n$, $14_s$, and $15_n$, $15_s$ and of the inductor members 21 and 22 may be annularly grooved as in the illustrative embodiment to provide annular pole face surfaces of concentrated flux density or may be in the form of smooth cylindrical surfaces. The inductor members 21 and 22 extend radially inwardly from their outer cylindrical portions and are secured to radially extending flanges 23 and 24, respectively, which are formed integrally of hubs 25 and 26, respectively. The hub 25 is nonrotatably secured by suitable means to the end of the shaft 7 and the astern hub 26 is rotatably mounted with respect to the shaft 7 by bearings 27 and drives a bevel gear 28 of the reversing differential mechanism 5. In the embodiment shown the shaft 7 is also rotatably mounted with respect to the driving rotor 8 by a bearing 29 carried by the partition web assembly 18 and a pilot bearing 30 carried by the hub 12.

The quantity of magnetic particle powder used in the coupling mechanism to establish the driving bond between the driving rotor and the individual output rotors upon selective energization of the coils $14_c$ and $15_c$ is preferably substantially equal to that quantity or volume required to fill the annular spaces between the opposing face portions of one of the driving electromagnets, either 14 or 15, and of the adjacent inductor member, 21 or 22, respectively. However, the quantity used may be more than that amount but substantially less than twice such quantity or volume. In accordance with the invention means are provided to insure transfer of the magnetic powder to the energized coupling unit under all drive operating conditions and to sufficiently distribute the particle powder between the two clutch units when both units are de-energized thereby preventing undue windage and turbulence and possible clutch seizures. Periodically, samples of the powder may be taken and additions may be made to compensate for the wearing or working in of the powder.

The ahead inductor member 21 is perforated to form two radially spaced annular belts of ports $21_a$ and $21_b$ and the partition web 18 and the inductor member 22 are similarly perforated to form two belts of ports $18_a$, $18_b$ and $22_a$, $22_b$, respectively, in substantial radial alignment with the ports $21_a$ and $21_b$. As best seen in Figure 2, the holes or ports $18_a$ and $18_b$ in the web member 18 are parallel to the common axis of rotation of the shafts 6 and 7 whereas the ports $21_a$, $21_b$ and $22_a$, $22_b$ are obliquely inclined at equal but opposite disposed angles to such axes. By so inclining these ports, these ports are in effect axial flow impellers and the relative rotation of the driving and driven rotors, as indicated by the "Ahead" and "Astern" arrows in Figure 2, tends to establish a toroidal flow through the several ports transferring the magnetic particles from the de-energized clutch compartment to the energized clutch compartment; transferring the magnetic particles from the ahead to the astern compartment upon de-energization of the ahead electromagnet 14 and transferring the powder from the astern to the ahead compartment when the astern clutch is de-energized.

In other words, when the ahead inductor member 21 tends to rotate with or is drivingly connected to the driving rotor 8, the counterrotation of the ahead and the astern inductor member 21 and 22 effects a toroidal air flow having a clockwise movement as viewed in Figure 1. Hence, when the field coil winding $14_c$ is de-energized, this toroidal air flow which is shown by the full line arrows in Figures 1 and 2 tends to carry the magnetic powder into the chamber 20 through the ports $21_b$, $18_b$ and $22_b$. If the field coil $15_c$ is energized, the powder thus transferred is retained in the magnetic gaps between the adjacent surfaces of the poles and the inductor member of the astern coupling unit. After reverse drive is established and the inductor member 22 tends to rotate with or is drivingly connected to the driving rotor 8, the toroidal air flow induced by the counterrotation of the inductor members 21 and 22 is reversed as shown by the broken line arrows in Figures 1 and 2, the toroidal flow being counterclockwise as viewed in Figure 1. Consequently, when the field coil $15_c$ is again deenergized releasing the magnetic powder, the powder is carried directly into the chamber 19 of the ahead clutch unit where it is retained in the magnetic gaps therebetween if the field coil $14_c$ is re-energized.

However, if the field coil $14_c$ remains de-energized, the toroidal flow induced prior to the inductor members coming to rest causes a distribution of the magnetic powder between the chambers 19 and 20, and the powder thus distributed is centrifuged by the rotation of the driving rotor against its inwardly facing surface out of contact with the inductor members without windage or turbulence. When one of the field coils is again re-energized, the magnetic particles in the adjacent chamber will tend to establish load transmitting bond between the pole faces of the outer pole member and the adjacent face of the inductor member thus tending to rotate the inductor member with the driving rotor. This in turn causes a counterrotation of the inductor member of the opposite clutch unit and the resultant turbulence within that clutch unit and toroidal air flow transfers the magnetic particles from the de-energized clutch unit through the ports $22_a$, $18_a$ and $21_a$, not necessarily in that order, to the energized clutch.

While the invention has been described in a two-way clutch mechanism wherein the counterrotation of the several clutch elements permits the use of stationary blades, vanes or ports for transferring the powder from one clutch unit to the other, it will be obvious to those skilled in the art that the invention is equally applicable to multiple clutch units of the change speed type wherein controllable pitch vanes may be provided for accomplishing this magnetic particle powder transfer between the several clutch units. Consequently, while only one specific embodiment of the invention has been disclosed in detail for the purposes of illustration, it will be appreciated that various improvements may be made therein without departing from the spirit and scope of the invention as defined in the following claims.

I claim:

1. A reversing clutch mechanism comprising, in combination a power input shaft and a power output shaft mounted for rotation relative to each other, a rotor of magnetic material non-rotatably secured to said power output shaft, a second rotor of magnetic material rotatably mounted with respect to said power output shaft, a reversing gear mechanism drivingly connecting said second rotor to said shaft, and a third rotor of magnetic material non-rotatably secured to said power input shaft, said third rotor embracing said first and second rotors and defining a chamber adapted to retain a magnetic particle material, said rotors having opposed radially spaced face portions, a first means alternatively energizable to establish a magnetic field interconnecting the face portions of said first and third rotors, a second means alternatively energizable to establish a magnetic field interconnecting the face portions of said second and third rotors, and magnetic particle material within said chamber in an amount limited to that required to form a load transmitting bond between the face portions of said third rotor and one of said first and second rotors whenever a magnetic field is established therebetween by one of said means, and fan means associated with said rotors and adapted to transfer the magnetic particle material from between said third rotor and said one of said first and second rotors and toward the other of said first and second rotors whenever said one means is de-energized and the other of said means is energized to establish a magnetic field therebetween.

2. In a compound multiple clutch mechanism, the combination comprising, a power input shaft and a power output shaft mounted for rotation relative to each other, a first rotor of magnetic material adapted to drive said power output shaft at a given speed ratio relative to said input shaft, a second rotor of magnetic material, a gearing mechanism drivingly interconnecting said first and second rotors through said power output shaft and adapted to cause said second roto to drive said power output shaft at a different speed ratio than that provided by said first rotor, and a third rotor of magnetic material non-rotatably secured to said power input shaft, said third rotor embracing said first and second rotors and defining a chamber adapted to retain a magnetic particle material, said rotors having opposed radially spaced face portions, a first means alternatively energizable to establish a magnetic field interconnecting the face portions of said first and third rotors, a second means alternatively energizable to establish a magnetic field interconnecting the face portions of said second and third rotors, and magnetic particle material within said chamber and responsive to the establishment of said fields to effect a load transmitting bond between said magnetically interconnected rotors, said magnetic particle material being in an amount limited to that required to form a load transmitting bond between the face portions of said third rotor and one of said first and second rotors whenever a magnetic field is established therebetween by one of said means, and fan means associated with at least one of said rotors and adapted to transfer the magnetic particle material axially from between said third rotor and said one of said first and second rotors and toward the other of said first and second rotors whenever said one means is de-energized and the other of said means is energized to establish a magnetic field therebetween.

3. In a drive mechanism adapted to provide a plurality of driving ratios between a power input shaft and a power output shaft, a plurality of output rotors of magnetic material mounted for rotation relative to each other, a gear mechanism drivingly interconnecting said output rotors through said output shaft and adapted to provide different driving relationships between said output rotors and said shafts, an input rotor of magnetic material adapted to be driven by a power input shaft, said input rotor defining a chamber embracing said first and second rotors and adapted to retain a quantity of magnetic particles therein, said input and output rotors having spaced opposing face portions thereon, means for selectively establishing magnetic fields bridging the space between the opposing face portions of said input rotor and of each of said output rotors, a quantity of magnetic particle material in said chamber in an amount adapted to form a load transmitting bond between said input rotor and one of said output rotors whenever a magnetic field is selectively established therebetween, and fan means associated with said rotors and adapted to transfer said magnetic material from between said input and said one output rotors to the space between said input member and another of said output members whenever a magnetic field is selectively established therebetween.

4. In a drive mechanism adapted to provide a plurality of driving ratios between a power input shaft and a power output shaft, a plurality of rotors of magnetic material mounted for rotation relative to each other, means for providing different driving relationships between said rotors and said shafts, means defining a chamber embracing said rotors adapted to retain a quantity of magnetic particles therein, said rotors having spaced opposing face portions thereon, means for selectively establishing magnetic fields bridging the space between adjacent face portions, a quantity of magnetic particle material in said chamber adapted to establish a load transmitting bond in response to the establishment of a magnetic field by said last-mentioned means between the adjacent face portions of certain of said rotors, said magnetic particle material being limited to substantially the amount required to form a load transmitting bond between adjacent face portions of certain of said rotors whenever a magnetic field is selectively established therebetween, and fan means associated with at least one of said rotors and adapted to transfer at least a portion of said magnetic material from between adjacent face portions of certain of said rotors when the magnetic field established therebetween is dissolved and toward the space between adjacent face portions of certain others of said rotors.

5. A reversing clutch mechanism comprising, in combination, two power output rotors of magnetic material mounted for rotation relative to each other, a reversing mechanism including a power output shaft and adapted to reversibly interconnect said output rotors to said output shaft, a third power input rotor of magnetic material rotatably and spacedly embracing said two output rotors and defining a chamber adapted to retain a magnetic particle material therein, said rotors having opposed radially spaced face portions, a first means for alternatively establishing a magnetic field interconnecting the face portions of one of said two rotors and said third rotor, a second means for alternatively establishing a magnetic field interconnecting the face portions of the other of said two rotors and said third rotor, and magnetic particle material within said chamber responsive to the selective establishment of one of said magnetic fields interconnecting said third rotor and one of said two output rotors, said material being limited substantially to that amount required to form a load transmitting bond between the face portions of said third rotor and one of said two rotors whenever a magnetic field is established therebetween, and fan means associated with said two output rotors adapted to establish toroidal air flow within said chamber whereby the magnetic particle material is transferred between said third rotor and said two rotors in accordance with the relative rotation of said two rotors.

6. In a reversing clutch mechanism as set forth in claim 5, said fan means comprising two radially spaced annular belts of ports formed in said two output rotors and each of the radially spaced ports in each belt of each rotor being disposed at an oblique angle to its axis of rotation.

References Cited in the file of this patent

UNITED STATES PATENTS

| | | |
|---|---|---|
| 2,112,248 | Feirtag | Sept. 30, 1952 |
| 2,752,021 | Trickey | June 26, 1956 |

UNITED STATES PATENT OFFICE

CERTIFICATE OF CORRECTION

Patent No. 2,839,170                           June 17, 1958

Arthur F. Grant

It is hereby certified that error appears in the printed specificatic of the above numbered patent requiring correction and that the said Letter Patent should read as corrected below.

Column 3, line 35, for "opposite" read -- oppositely --; column 4, line 72, for "roto" read -- rotor --; column 6, line 56, list of reference cited for "2,112,248 Feirtag ------ Sept. 30, 1952" read -- 2,612,248 Feiertag ------Sept. 30, 1952 --.

Signed and sealed this 23rd day of September 1958.

(SEAL)
Attest:

KARL H. AXLINE                                             ROBERT C. WATSON

Attesting Officer                                        Commissioner of Patent